(12) United States Patent
Gollnick et al.

(10) Patent No.: US 11,257,610 B2
(45) Date of Patent: *Feb. 22, 2022

(54) MULTIPLE CONDUITS BUNDLED TOGETHER IN A COMBINATION CONDUIT CONFIGURATION

(71) Applicant: Biamp Systems, LLC, Beaverton, OR (US)

(72) Inventors: Charles D. Gollnick, Sherwood, OR (US); Joshua Beltran, Portland, OR (US); Rashid Skaf, Plano, TX (US); Joseph E. Andrulis, Irving, TX (US); Aaron Cohen, Portland, OR (US); Kenneth Cornelison, Cincinnati, OH (US); Shirley Briggs, West Linn, OR (US); Gregory Saunders, Worcester, MA (US)

(73) Assignee: Biamp Systems, LLC, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/087,703

(22) Filed: Nov. 3, 2020

(65) Prior Publication Data

US 2021/0225557 A1    Jul. 22, 2021

Related U.S. Application Data

(63) Continuation of application No. 16/748,676, filed on Jan. 21, 2020, now Pat. No. 10,825,578.

(51) Int. Cl.
*G02B 6/44*     (2006.01)
*H01B 7/18*     (2006.01)
*H01B 7/24*     (2006.01)
*H01B 3/44*     (2006.01)
*H01B 7/38*     (2006.01)

(52) U.S. Cl.
CPC ............... *H01B 7/18* (2013.01); *G02B 6/443* (2013.01); *G02B 6/4497* (2013.01); *H01B 3/443* (2013.01); *H01B 7/24* (2013.01); *H01B 7/385* (2013.01)

(58) Field of Classification Search
CPC .......... H01B 7/18; H01B 7/385; H01B 7/221; H01B 9/005; G02B 6/443; G02B 6/4416
USPC ...................................................... 174/70 R
See application file for complete search history.

(56) References Cited

U.S. PATENT DOCUMENTS

| | | | |
|---|---|---|---|
| 6,839,494 B2 | 1/2005 | Clatanoff et al. | |
| 7,581,565 B1* | 9/2009 | Torrance | F16L 57/06 138/110 |
| 2003/0059183 A1 | 3/2003 | Militaru | |
| 2003/0123824 A1 | 7/2003 | Tatarka et al. | |
| 2004/0071382 A1* | 4/2004 | Rich | G08B 13/124 385/12 |
| 2005/0024210 A1* | 2/2005 | Maki | G08B 13/2497 340/566 |
| 2012/0217061 A1* | 8/2012 | Runzel, IV | H01B 7/009 174/72 R |

* cited by examiner

*Primary Examiner* — Sherman Ng

(57) ABSTRACT

Example embodiments provide a device that includes a main cable jacket including one or more sub-cable jackets, and each of the sub-cable jackets includes a number of conduits.

6 Claims, 1 Drawing Sheet

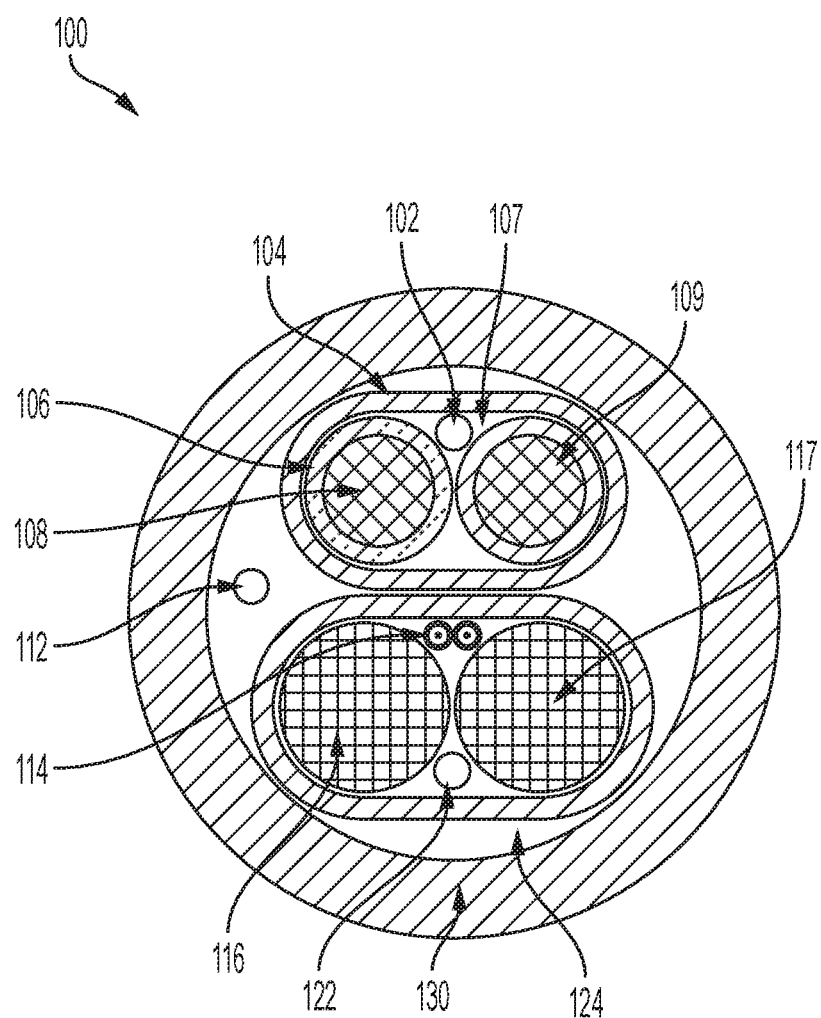

MULTIPLE CONDUITS BUNDLED TOGETHER IN A COMBINATION CONDUIT CONFIGURATION

CROSS-REFERENCE TO RELATED APPLICATIONS

This application is a continuation of U.S. patent application Ser. No. 16/748,676, filed on Jan. 21, 2020, the entire disclosure of which is incorporated by reference herein.

FIELD OF INVENTION

This application relates to a cable and more specifically to a cable with multiple different conduits bundled together in a combination conduit configuration.

BACKGROUND OF THE INVENTION

Certain electrical devices, which are hung from the ceiling, such as audio products (e.g., speakers, microphones, etc.) and other industry products associated with a conference room or similar type of working space, may require an expert installation due to safety and related integrity concerns.

Certain products which require an array of conduits to provide signals, power, support, etc., often have many wires of varying materials, appearances, etc., dangling about, which can cause installation burdens and unsavoury appearances.

SUMMARY OF THE INVENTION

The present application relates to a device that includes a main cable jacket that includes one or more sub-cable jackets, and each of the one or more sub-cable jackets includes a plurality of conduits.

BRIEF DESCRIPTION OF THE DRAWINGS

FIG. 1 illustrates a cross-section view of a combination conduit configuration according to example embodiments.

DETAILED DESCRIPTION

Example embodiments include cable configurations for a single cable with various internal conduits and sub-cables which may be used to provide power, signals and supports to a hanging electrical device.

In one cable use example, pendant loudspeakers are mounted overhead in a user working environment so sound can project downward towards individuals working and conducting business in a workplace environment or other environment. The speakers are hung with wires which may provide one or more of power, electrical speaker signals, which may be the same cables that provide power, support cables, digital data (e.g., CAT cable), fiber optics, etc. As the number of installations continues to rise, the desire to reduce the amount of different cables utilized, along with ensuring the correct cables are available, continues to increase.

FIG. 1 illustrates a cut-open cross-sectional view of a cable housing configuration according to example embodiments. Referring to FIG. 1, the configuration 100 provides a first main jacket or insulation layer, such as polyvinyl chloride (PVC). The outside shell/main jacket sleeve 130 may be thicker than the other inner jackets 104 and 124, which may also be PVC.

Inside the shell/jacket 130 may be three different components, one is a rip cord 112, used to rip open the jacket 130 to expose the wires for fitting and assembly. Other internal contents include the power cable inner jacket 104 and the support cable and a fiber cable inner jacket 124. Within the power cable inner jacket 104 are a pair of electrical/power cables 108/109, which may represent positive and negative power sources, and which may have their own respective insulation layers 106/107. Also, in the inner jacket 104 may be another rip cord 102 to adjust the length of the cables inside the inner jacket 104. The support cable 116/117 and fiber pair 114 are disposed inside of the inner jacket 124, which may also house a separate rip cord 122.

The first jacketed sub-cable 104 may be referred to as the audio cable which shall include two insulated electrical conductors 108/109 and a packing material polypropylene thread intended to act as a "rip cord" 102 to facilitate easy stripping of the audio cable's jacket.

The second jacketed sub-cable 124 may be called the optical cable 124 which shall include one, two, or more optical fibers 114, one, two or more stainless steel strength members 116/117 (a.k.a. messenger wires), and a packing material polypropylene thread intended to act as a "rip cord" 122 to facilitate easy stripping of the optical cable's jacket.

In one example, the power cable inner jacket 104 can be different shapes, such as circular, square, rectangular, oval, elliptical, etc., and hold one or more power cables. The support cable and fiber inner jacket 124 can also be different shapes and house one or more support cables. Also, a fewer or greater number of rip cords can be provided in multiple locations throughout the main jacket 130 and/or outside or inside the sub-cable jackets. The main outer jacket 130 can be a different shape and house fewer or greater components including other types of cables (not depicted).

In one example embodiment, an apparatus may include a main cable jacket that houses one or more sub-cable jackets, such that each of the one or more sub-cable jackets includes a plurality of conduits. The one or more sub-cable jackets may house two insulated electrical conduits.

The one or more sub-cable jackets may house two metal support cables. The sub-cable jacket that houses the two metal support cables may further house a pair of fiber optic cables. The one or more sub-cable jackets may house two sub-cable jackets, such that the first sub-cable jacket is the sub-cable jacket that houses the two metal support cables and the fiber optic cables, and the second sub-cable jacket may include two insulated electrical conduits.

In another embodiment, the one or more sub-cable jackets may house two metal support cables. The sub-cable jacket that houses the two metal support cables may further house audio cables. The one or more sub-cable jackets may house two sub-cable jackets, such that the first sub-cable jacket is the sub-cable jacket that houses the two metal support cables, and the second sub-cable jacket may include two insulated electrical conduits and at least one optic cable.

In yet another embodiment, a first sub-cable jacket that houses metal support cables that are audio cables and a second sub-cable jacket that houses insulated electrical conduits that are an optical cable.

The main cable jacket may house three rip cords. With regard to the rip cords, the first rip cord is housed inside the first sub-cable jacket, a second rip cord is housed inside the second sub-cable jacket and a third rip cord is housed outside the first sub-cable jacket and the second sub-cable jacket.

The cable 100 shall comply with the requirements of UL Standard 13 and shall be UL listed under UL 13. The cable shall be suitable for use in both indoors and outdoors/wet location. The two audio electrical conductors in the audio cable shall be 18 AWG, 19/30 stranded, soft-annealed copper wire approximately 1.16 mm thick in accordance with UL 13 Table 5.2. The two audio electrical conductors should have DC resistance of less than 6.66 Ω/1000 feet at 20° C. and less than 6.79 Ω/1000 feet at 25° C. in accordance with UL 13 Table 20.2. The two audio electrical conductors shall lie flat within the audio cable jacket, i.e. no internal twisting. The insulation surrounding the electrical conductors 108/ 109 should be PVC without any covering of nylon. The insulation surrounding one of the electrical conductors shall be red in color. The insulation surrounding the other electrical conductor shall be black in color. The insulation surrounding the electrical conductors should have tensile strength less than 13.79 MPa in accordance with UL 13 Table 7.3B.

The insulation surrounding the electrical conductors should be at least 15 mil (0.38 mm) thick in accordance with UL 13 Table 7.3B. The insulation surrounding the electrical conductors should be QMTT2 listed TW rated compound for +60 C wet in accordance with UL 13 Section 30. The insulation surrounding the electrical conductors should be rated for 300V and withstand both 2500 VDC for 2 seconds and 1500 VAC for 2 seconds in accordance with UL 13 Section 19. The insulation surrounding the electrical conductors should pass a cold bend test of Insulation at −40 C in accordance with UL 13 Section 21. The jacket surrounding the electrical cable should be PVC without a covering of nylon. The Jacket surrounding the electrical cable should be the same color as the outer jacket, black or white. The jacket surrounding the electrical cable should have tensile strength less than 17.24 MPa in accordance with UL 13 Table 13.2.

The jacket 106/107 surrounding the electrical cable should be at least 23 mil (0.58 mm) thick in accordance with UL 13 Table 13.2. The jacket surrounding the electrical cable should pass the UL 2556 sunlight resistance test, 720 hr xenon-arc or carbon arc (jacket avg. tensile strength/ultimate elongation >0.80) in accordance with UL 13 Section 29. The jackets 106/107 surrounding the electrical cables should have insulation resistance >100 MΩ on 1000 feet of cable in accordance with UL 13 Section 31. The two optical fibers 114 in the optical cable shall be multi-mode 50/125/900 um core/clad/buffer diameter, type OM3, OM4, or OM5 per ISO 11801. The two optical fibers shall have buffers of different colors for identification. The two optical fibers should meet all applicable requirements of UL 13, especially Section 8.2.

The two stainless steel strength members 116/117 in the optical cable 124 shall each have bare (no "insulation" or "coating") 1/16" of 7×7 stainless-steel wire rope meeting the requirements of US Federal specification RR-W-410 (latest revision). Each stainless-steel strength member shall independently have a minimum breaking strength of at least 480 lbs (≈217.7 kg). The stainless-steel strength members may not be suitable to carry electrical current.

The two optical fibers 114 and the two stainless-steel strength members 116/117 shall lie flat within the optical cable jacket, i.e. no internal twisting. The jacket surrounding the optical cable should be PVC without a covering of nylon. The jacket surrounding the optical cable shall be the same color as the outer jacket, black or white. The jacket surrounding the optical cable should have tensile strength less than 17.24 MPa in accordance with UL 13 Table 13.2. The jacket surrounding the optical cable should be at least 23 mil (0.58 mm) thick in accordance with UL 13 Table 13.2. The jacket surrounding the optical cable should pass the UL 2556 sunlight resistance test, 720 hr xenon-arc or carbon arc (jacket average tensile strength/ultimate elongation >0.80) in accordance with UL 13 section 29. The jacket surrounding the optical cable should have insulation resistance >100 MΩ on 1000 feet of cable in accordance with UL 13 section 31. The overall outer jacket 130 surrounding the polypropylene thread, jacketed audio cables 108/109, and jacketed optical cable 114 should have tensile strength less than 17.24 MPa tensile strength in accordance with UL 13 Table 13.2. The overall outer jacket 130 surrounding the polypropylene thread, jacketed audio cable, and jacketed optical cable should be at least 23 mil (0.58 mm) thick in accordance with UL 13 table 13.2. The overall outer jacket surrounding the polypropylene thread, jacketed audio cable, and jacketed optical cable should pass the UL 2556 sunlight resistance test, 720 hr xenon-arc or carbon arc (jacket average tensile strength/ultimate elongation >0.80) in accordance with UL 13 section 29. The overall outer jacket 130 surrounding the polypropylene thread, jacketed audio cable, and jacketed optical cable should have insulation resistance >100 MΩ on 1000 feet of cable in accordance with UL 13 section 31.

The optical cable 114 and the audio cables 108/109 shall lie flat within the overall outer jacket, i.e. no internal twisting. The cable as a whole assembly should pass a cold bend test at −40° C. in accordance with UL 13 Section 22. The cable as a whole assembly should pass the spark test 2500 VDC and 1750 VAC @ 60 Hz in accordance with UL 13 section 18. The cable as a whole should pass the UL1685 vertical-tray flame test 70,000 BTU/hour and char less than 244 cm in accordance with UL 13 section 28.2.1. The cable as a whole assembly should pass the wet test for at least 12 weeks in accordance with UL 13 Section 30. The cable as a whole assembly should pass crush resistance of at least 1334N in accordance with UL 13 section 34. The cable as a whole assembly should not break when 25 lbs of force is applied longitudinally for one minute in accordance with UL 13 section 44. The outer jacket of the cable shall be marked in accordance with UL 13 section 47 at least every 60 cm. The outer jacket shall have a smooth, matte finish. The overall cross-sectional shape of the audio and optical cables may be oval. The overall cross-sectional shape of finished cable shall be approximately round. The inner members of cable, i.e. the audio cable, the optical cable, and the packing materials shall not "print through" the outer jacket, i.e. influence the outer shape of the finished cable. The cable shall have a minimum bending radius 19 mm excluding damage to the optical fibers. The cable shall be suitable for use in ambient environments of −40 to 60° C. with 0-99% relative humidity (non-condensing). The cable shall be RoHS compliant.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be configured with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., materials, shapes, sizes, etc.) thereto.

What is claimed is:

1. An apparatus comprising: a first sub-cable jacket that houses two insulated electrical conduits and a first rip cord and a second sub-cable jacket that houses metal support cables, fiber optic cables and a second rip cord, wherein the first sub cable jacket is an audio cable and the second sub cable jacket is an optical cable.

2. The apparatus of claim 1, wherein the first sub-cable jacket is housed in a main cable jacket.

3. The apparatus of claim 1, wherein the second sub-cable jacket is housed in a main cable jacket.

4. The apparatus of claim 3, wherein the main cable jacket houses three rip cords.

5. The apparatus of claim 4, wherein a third rip cord is housed outside the first sub-cable jacket.

6. The apparatus of claim 5, wherein the third rip cord is housed outside the second sub-cable jacket.

\* \* \* \* \*